United States Patent
Belling et al.

(10) Patent No.: US 7,680,132 B2
(45) Date of Patent: *Mar. 16, 2010

(54) AVOIDING MALFUNCTIONS IN MEDIA GATEWAY CONTROLLERS AND/OR MEDIA GATEWAYS

(75) Inventors: Thomas Belling, München (DE); Uwe Dölling, Berlin-Buchholz (DE); Lorenzo Guarino, Lissone (IT); Georg Schmitt, München (DE)

(73) Assignee: Siemens Aktiengesellschaft, Munich (DE)

( * ) Notice: Subject to any disclaimer, the term of this patent is extended or adjusted under 35 U.S.C. 154(b) by 1244 days.

This patent is subject to a terminal disclaimer.

(21) Appl. No.: 10/520,630

(22) PCT Filed: Jul. 3, 2003

(86) PCT No.: PCT/DE03/02229

§ 371 (c)(1),
(2), (4) Date: Aug. 19, 2005

(87) PCT Pub. No.: WO2004/006598

PCT Pub. Date: Jan. 15, 2004

(65) Prior Publication Data

US 2006/0153205 A1    Jul. 13, 2006

(30) Foreign Application Priority Data

Jul. 9, 2002    (DE) ................................ 102 31 026

(51) Int. Cl.
*H04L 12/56* (2006.01)

(52) U.S. Cl. ......................... 370/401; 709/232; 709/238
(58) Field of Classification Search ................. 370/338, 370/352, 389, 400, 401; 709/232, 238
See application file for complete search history.

(56) References Cited

U.S. PATENT DOCUMENTS

| 2003/0099227 | A1 | 5/2003 | Yoo | |
|---|---|---|---|---|
| 2003/0227908 | A1* | 12/2003 | Scoggins et al. | 370/352 |
| 2005/0105495 | A1* | 5/2005 | Hollis et al. | 370/338 |

FOREIGN PATENT DOCUMENTS

| WO | WO-01/06800 A1 | 1/2001 |
|---|---|---|
| WO | WO-03/024052 A1 | 3/2003 |

* cited by examiner

*Primary Examiner*—Kevin C Harper
*Assistant Examiner*—Henry Baron
(74) *Attorney, Agent, or Firm*—King & Spalding L.L.P.

(57) ABSTRACT

An efficient change to the coding of terminations at a media gateway is made possible by means of a method for carrying out an instruction (2), signalled by a media gateway controller (MGC) to a media gateway (MGW) for changing the coding of at least one live load connection section termination (termination B in FIG. 1) at the media gateway (MGW), whereby the media gateway (MGW), on receipt of the instruction, first carries out a check of the connectability of the terminations (termination B and (termination A in FIG. 1) of said context (termination B termination A etc) with new coding (2, 5/7/9) when said media gateway (MGW) determines, based on one (5 or 7 or 9 in FIG. 1) or several further instructions received by the media gateway (MGW), that all instructions for changing of codings in terminations in said context are available thereto.

21 Claims, 2 Drawing Sheets

AVOIDING MALFUNCTIONS IN MEDIA GATEWAY CONTROLLERS AND/OR MEDIA GATEWAYS

This application is a §371 National Stage application of PCT/DE2003/02229, which was filed in the German language on Jul. 3, 2003, which claims the benefit of priority to German application No. 102 31 0262, filed Jul. 9, 2002.

TECHNICAL FIELD OF THE INVENTION

The invention relates to a method and device for avoiding malfunctions in media gateway controllers and/or media gateways.

BACKGROUND OF THE INVENTION

ITU-T protocols H.248 and Q.1950 specify the control of "Media Gateways," which are commonly referred to as MGWs in cellular mobile radio networks and fixed networks, by media gateway controllers (MGCs). Protocol Q.1950 "Bearer independent Call Bearer Control Protocol" (CBC) is used in conjunction with the BICC protocol Q.1902.4 already specified by the ITU-T. These protocols can also be used for 3GPP applications. Media Gateways commonly perform functions such connecting load connection sections (for transmission of load data such as voice, text, multimedia data) of telecommunications networks, and can also convert between various codings, such as G.711 or AMR voice codings. In this document, load connection section termination, also refered to herein as termination, is taken to be the termination of a section of a network connection which is switched through the MGW for data such as voice or multimedia (sound or picture) at this MGW. Through this termination, the MGW sends and/or receives data belonging to the load connection. In voice usage of protocols H.248 and Q.1950 a load connection section termination corresponds to a "termination".

The above-mentioned protocols allow existing load connections to be changed, by selecting another coding for example. The signaling used between MGC and MGW (protocols H.248 and Q.1950) is designed so that each termination in the MGW is changed independently of the other each termination in the MGW is changed independently of the other terminations connected with it within the MGW. For example the MGW can be instructed to use another coding at this termination, or to transmit and/or receive no data, which may indicate deactivation of this termination at the MGW and/or isolation of this termination at the MGW.

The MGW does not know when changing a termination whether other terminations connected by it to this termination will subsequently be changed. Therefore, when changing a termination, the MGW must immediately take measures if it is connected with other terminations. In voice usage of protocols H.248 and Q.1950, terminations connected to each other within an MGW are in what is known as a shared "context" and different codings are produced that use what is known as transcoding to convert these codings into one another. In special cases however the coding of all terminations connected to each other in the MGW which lie in the same "context" should be changed almost simultaneously, for example, within the framework of what is known as BICC "codec modification" or "codec renegotiation" (see Q.1902.4), via which the coding of existing voice connections can be changed.

3GPP also uses said BICC procedures to switch over existing load connections between load data types such as voice and multimedia data (i.e. a combination of voice and pictures in a shared coding). The MGC can recognize such situations on the basis of what is known as "Call Control" signaling e.g. Q.1902.4. Since the signaling of the MGC occurs sequentially at the MGW, an almost simultaneous switchover of all connected terminations within an MGW results in possibly undesired operating behavior. An example of such undesirable behavior may occur if the MGW briefly activates a transcoder which is then almost immediately deactivated again thereby generating unnecessary operational load in an MGW and reducing the throughput. It would be acceptable, but to date has not been technically possible, to briefly interrupt the connection. In addition the MGW may establish, on changing the first termination, that it cannot convert the new coding of this termination into the coding used at the other termination(s). This can, for example, occur if the changeover is to be between a voice connection and a multimedia connection or a general data connection. The MGW in this case would reject the change of the load connection using H.248/Q.1950 signaling.

SUMMARY OF THE INVENTION

The invention relates to a method for executing a command signaled from a Media Gateway Controller to a Media Gateway to change the coding of at least one load data connection section termination at the Media Gateway, where the Media Gateway, after arrival of the command, checks for the connectibility of the terminations of this context with changed coding if it establishes, as a result of one or more further signaled commands arriving at the Media Gateway that it has available current commands to be executed for changing the codings in terminations of this context.

The invention allows for an efficient changeover of codings in terminations present at a media gateway on an instruction to the media gateway and enables switching between codings that the media gateway is unable to convert into each other.

In accordance with an aspect of the invention, a media gateway (MGW), on arrival of a command to change the coding of at least one termination of a context at the MGW, delays testing of the connectibility of the terminations of this context with new coding, which is changed by a command for at least one termination, and, if necessary, also delays activation of a transcoding. These actions are delayed until the MGW establishes, on the basis of one or more signals arriving at the MGW, that it has the current outstanding commands for changing codings in terminations of this context available, that is, those commands that are not already procesed.

An unnecessary operating load caused by a short-term switching on and off of a transcoder can be avoided in the MGW. In an aspect of the invention, the media gateway establishes that the current commands to be executed are available. For example, the MGW may establish that the current commands which are known or forwarded to one or more MGC(s) and/or media gateways for changing coding in terminations of this context are available. The media gateway may establish this by using the signaling in the BICC procedures "Codec Modification" and "Codec Renegotiation" according to Q.1902.4 and Q.1950 without messages having to be modified. The behavior of the MGW in accordance with this aspect of the invention as a reaction to incoming Q.1950 messages deviates from the behavior previously specified in Q.1950.

According to a further aspect of the invention, an MGW can establish on the basis of different further signaling (see reference nos. 5/7/9 in FIG. 1) that it has the commands which are available for changing terminations of this context. For example, if it has received suitable signaling from the MGC such as confirm characteristic which confirm a change of the characteristic (here of the coding), or because it has received, for the terminations in a context for termination B affected by the first command a command for changing the coding of this termination.

According to another aspect of the invention, a Media Gateway Controller which initiates the changing of a load connection using the BICC procedures "Codec Modification" and "Codec Renegotiation" according to Q.1902.4 can simultaneously initiate these procedures in the direction of the branches of the load connection coming together within it. The synchronization of these separate procedures is not currently specified in BICC. A suitable synchronization of the procedures in the MGC is also enabled by this invention.

The following embodiments of the invention are provided as examples. The invention is not limited to the embodiments provided below.

1. The sequence of signaling for the BICC procedures "Codec Modification" and "Codec Renegotiation" in accordance with Q.1902.4 is utilized in order to adapt the procedures to the MGW other than in the way described in Q.1950 so that the MGW does not check for transcoding needed between terminations in a context, as well as for the activation of transcoders that may be necessary, until the point at which, in the case of a joint modification of a number of terminations, it has already received signaling from the MGC relating to the modification of the terminations.

2. In the case where the MGC uses the Q.1950 "Reserve Characteristics" procedure to cause the MGW to modify a termination, the MGW should perform the checking and activation of the transcoder when the MGC confirms to the MGW the modification of this termination by means of the Q.1950 "Confirm Characteristics" procedure.

3. In a further embodiment of 2, where the MGC uses the Q.1950 "Reserve Characteristics" procedure to cause the MGW to modify a termination, the MGW should also check and activate the transcoder when the MGW has received from a media gateway at the other end of a load connection section with a termination in the same context a message to modify the load connection, for example the Q.2630 "Modify Bearer" procedure.

4. In a further embodiment of 2, where the MGC uses the Q.1950 "Reserve Characteristics" procedure to cause the MGW to modify a termination, the MGW should also check and activate the transcoder when the MGW has also received commands from the MGC for modification via the Q.1950 "Reserve Characteristics" procedure or the Q.1950 "Modify Characteristics" procedure for all terminations in the same context.

5. In the case where the MGC uses the Q.1950 "Reserve Characteristics" procedure to cause the MGW to modify a termination, the MGW should only perform the checking and activation of the transcoder when the media gateway at the other end of the load connection section corresponding to the termination signals that the load connection is to be modified.

6. In a further embodiment of 5, where the MGC uses the Q.1950 "Modify Characteristics" procedure to cause the MGW to modify a termination, the MGW should only check and activate the transcoder when the MGW has also received commands from the MGC for modification via the Q.1950 "Reserve Characteristics" procedure or the Q.1950 "Modify Characteristics" procedure for the terminations in the same context.

7. In the case where the MGC is jointly modifying a number of terminations belonging to a load connection, where it uses the Q.1950 "Modify Characteristics" procedure for at least two terminations, the MGC should first execute the Modify Characteristics" procedure for all these terminations before it sends the messages "Modify to Selected Codec information" or "Modify Coded" to the media gateways at the other ends of the corresponding load connection sections for Q.1902.4. This may occur at an MGC which initiates a simultaneous change of the load connection in two or more directions. According to BICC, Q.1902.4, the procedures "Codec Modification" and "Codec Renegotiation" execute independently from this MGC in all directions.

8. In further embodiments of 1 to 7, in the MGW after the signaling via the Q.1950 protocol by means of the "Reserve Characteristics" procedure or the Modify Characteristics" procedure that the coding of a specific termination is to be changed, the terminations connected to it in the same "context" are deactivated (H.248 "stream mode"), i.e. the MGW does not direct any load data from and to these terminations. Only the first termination changed goes into the transmit and receive state, i.e. forwards load data from and to the terminations involved in the same "context". Only after the arrival of commands for changing these inactive terminations in accordance with embodiments 1 to 7 will the MGW check in each case whether it can connect the termination(s) in their new coding to each other.

9. In further embodiments of 1 to 8, the MGW does not immediately establish the connections after the check specified in 1, but first, even if also using additional separate signaling, for example the lu FP initialization specified in 3GPP in TS 25.415 and 29.415, initiates the changeover of the coding at these terminations with the media gateway at the other ends of the load connection sections to be connected again.

10. In further embodiments of 1 to 9, the MGW does not activate the relevant termination immediately for load data, i.e. the MGW does not set it to the transmit and receive data state after receiving the command for the change from the MGC, but only does so if the changeover of the coding is undertaken by a subsequent separate signal, for example the lu FP initialization specified in 3GPP in TS 25.415 and 29.415, with the media gateway at the other end of the load connection section.

11. In further embodiments of 1 and 10, the MGW restricts the period after arrival of the first command to change a termination until the arrival of the command which initiates the check. If in this period the relevant commands for the associated load connections have not arrived, the MGW can again establish the original connection of the load connections with the old coding.

BRIEF DESCRIPTION OF THE DRAWINGS

The invention is explained in more detail below with reference to exemplary embodiments and the drawing figures in which.

DETAILED DESCRIPTION OF THE INVENTION

Figure 1:
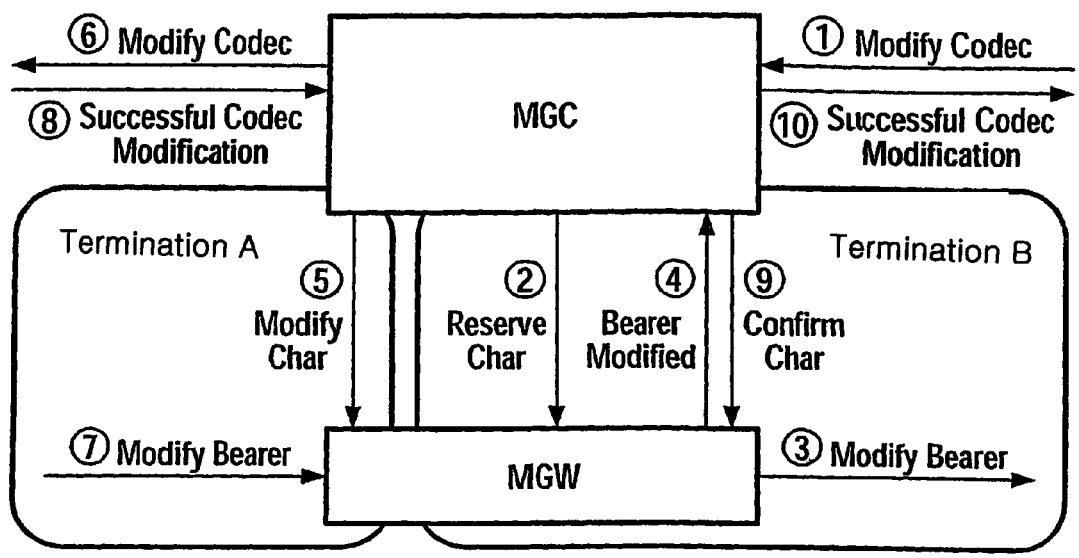
FIG. 1 shows the BICC and CBC message flow when switching over a load connection from one coding to another coding where an MGC and MGW process and forward a modification of the coding of a load connection initiated by another media gateway.

FIG. 1 shows an aspect of the invention in which the BICC and CBC message flow when switching over a load connection from one coding to another coding where a pair having an MGC and an MGW processes and forwards a modification of the coding of a load data connection initiated by another media gateway is shown.

The corresponding numbers specify the timing sequence of the messages. Messages in the areas delimited by rounded edges each relate to a corresponding termination. For simplification the message flows are only shown for two terminations involved. Further terminations within the connection must be handled in a similar way. The terminations are connected to each other within the MGW and lie in the same "context". Messages 2,3,4,5,7 and 9 are each confirmed by a message in the opposite direction following them.

The BICC procedure "Codec Modification" is also shown. With the BICC procedure "Codec Renegotiation", to which the present invention can also be applied, the message flow is identical, but instead of the "Modify Codec" message 1 and 6 the "Modify to Selected Codec information" message is used.

The message flow is used in accordance with this aspect of the invention as follows:

1. The messages 2 (Q.1950 "Reserve Characteristics") and 5 (Q.1950 "Modify Characteristics") are used unchanged, as described in the protocols. The way that the MGW behaves in relation to these messages changes fundamentally.
2. After the arrival of message 2 the MGW checks whether this message is the first instruction relating to the corresponding "context" which requires a change to the coding. If this condition applies, the MGW deactivates the terminations associated with this termination as well as the terminations in the same "context". The message explicitly defines the desired new coding for the "context".
3. Subsequently, but before message 3 is sent, the MGW activates the termination B, i.e. puts this into the transmit and receive load data state.
4. After arrival of message 5, or 7, or 9 the MGW checks whether the new coding of a connection of the terminations A and B is possible. If this is not possible, the MGW sends a corresponding error message in the receive confirmation for 5 or 9. The further error signaling is not shown here.
5. If it is possible, the MGW activates termination A again using the new coding (in the case of using message 5 in Point 4, but not until the arrival of message 7) and thereby "connects" the terminations A and B.
6. The further inactive terminations not shown here are changed in a similar way.

Figure 2:
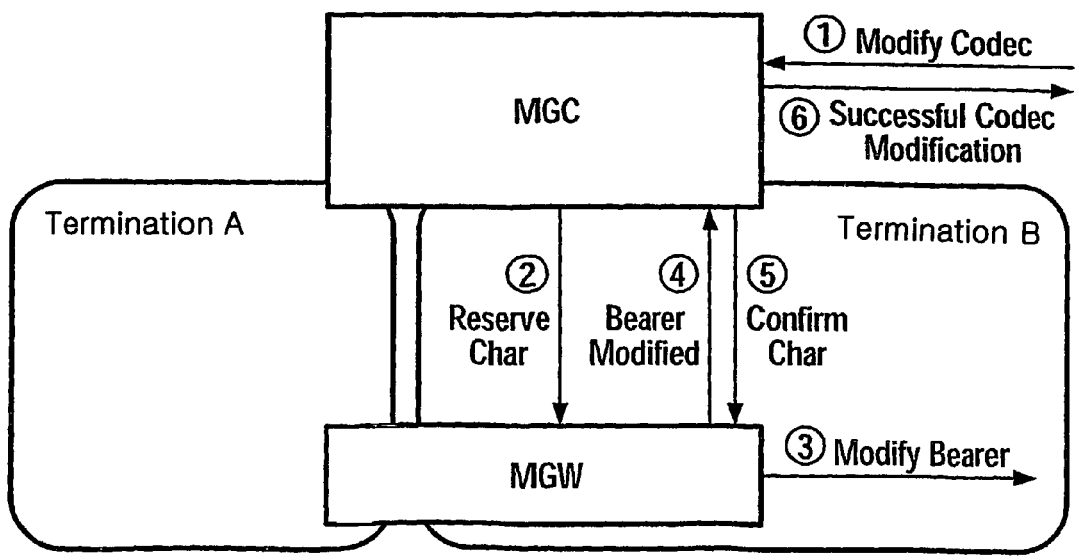
FIG. 2 shows the BICC and CBC message flow when switching over a load connection from one coding to another coding where anMGC and MGW process and forward a modification of the coding of a load connection initiated by another media gateway.

FIG. 2 shows another aspect of the invention in which the BICC and CBC message flow on changeover of a load connection from one coding to another coding where a pair having an MGC and an MGW processes a modification of the coding of a load connection initiated by another media gateway but does not forward it is shown.

The corresponding numbers specify the timing sequence of the messages. Messages in the areas delimited by rounded edges each relate to a corresponding termination. Messages 2,3,4 and 5 are each confirmed by a message in the opposite direction following them.

The BICC procedure "Codec Modification" is also shown. With the BICC procedure "Codec Renegotiation", to which the present invention can also be applied, the message flow is identical, but instead of the "Modify Codec" message 1, the "Modify to Selected Codec information" message is used.

The message flow used in accordance with this aspect of the invention is as follows:

1. The message 2 (Q.1950 "Reserve Characteristics") is used unchanged, as described in the protocols. The way that the MGW behaves in relation to these messages changes fundamentally.
2. After the arrival of message 2, the MGW checks whether this message is the first instruction relating to the corresponding "context" which requires a change to the coding. If this condition applies, the MGW deactivates the terminations associated with this termination as well as the terminations in the same "context". The message explicitly defines the desired new coding for the "context".
3. Subsequently, but before message 3 is sent, the MGW activates termination B, i.e. puts this into the transmit and receive load data state.
4. After arrival of message 5, the MGW checks whether the new coding of a connection of terminations A and B is possible. If this is not possible, the MGW sends a corresponding error message in the receive confirmation for 5. The further error signaling is not shown here.
5. If necessary based on the result of the different codings at termination A and B, the MGW inserts a transcoder and then activates termination A again using the new coding and thereby "connects" terminations A and B.

Figure 3:
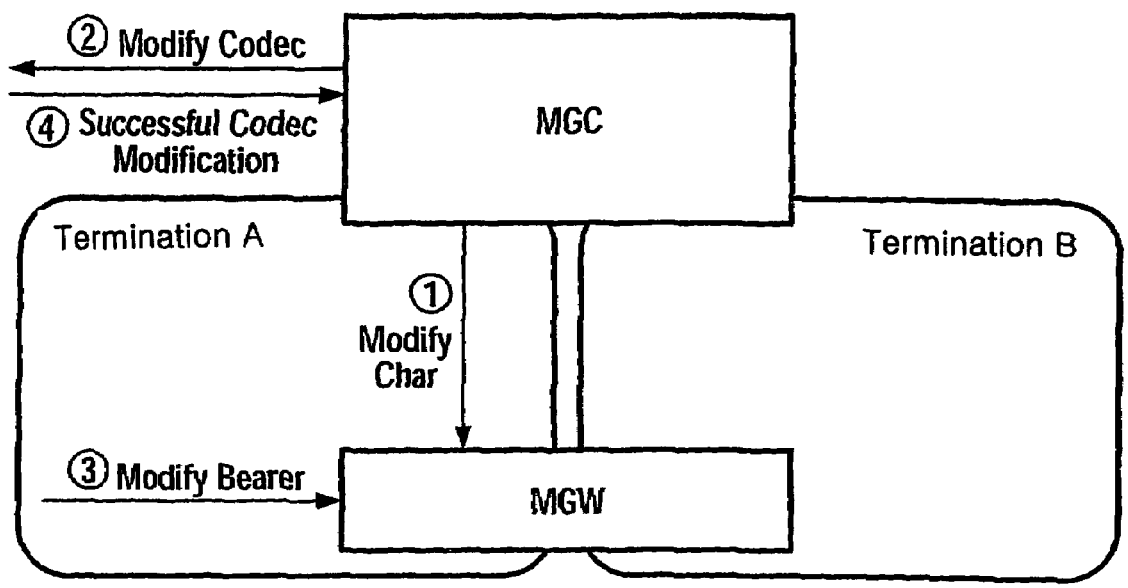
FIG. 3 shows the BICC and CBC message flow when switching over a load connection from one coding to another coding where an MGC and MGW initiate the modification of a coding of a load connection in the direction of a load connection section.

FIG. 3 shows an aspect of the invention in which the BICC and CBC message flow when switching over a load connection from one coding to another coding where a pair having an MGC and an MGW initiates modification of the coding of a load data connection in the direction of a load connection section is shown.

The corresponding numbers specify the timing sequence of the messages. Messages in the areas delimited by rounded edges each relate to a corresponding termination. Messages 1 and 3 are each confirmed by a message in the opposite direction immediately following them.

The BICC procedure "Codec Modification" is shown. With the BICC procedure "Codec Renegotiation", to which the present invention can also be applied, the message flow is identical, but instead of the "Modify Codec" message 2 the "Modify to Selected Codec information" message is used.

The message flow is used in accordance with this aspect of the invention as follows:

1. The message 1 (Q.1950 "Modify Characteristics") is used unchanged as described in the protocols. The way that the MGW behaves in relation to these messages changes fundamentally.
2. After the arrival of message 1, the MGW checks whether this message is the first instruction relating to the corresponding "context" which requires a change to the coding. If this condition applies, the MGW deactivates the terminations associated with this termination as well as the terminations in the same "context". The message explicitly defines the desired new coding for the "context".

3. Subsequently, the MGW activates termination A, i.e. puts this into the transmit and receive load data state.
4. After arrival of message 3, the MGW checks whether the new coding of a connection of terminations A and B is possible.
5. If this is necessary as a result of the different codings at termination A and B, the inserts a transcoder and then activates termination B again using the new coding and thereby "connects" terminations A and B.

Figure 4:
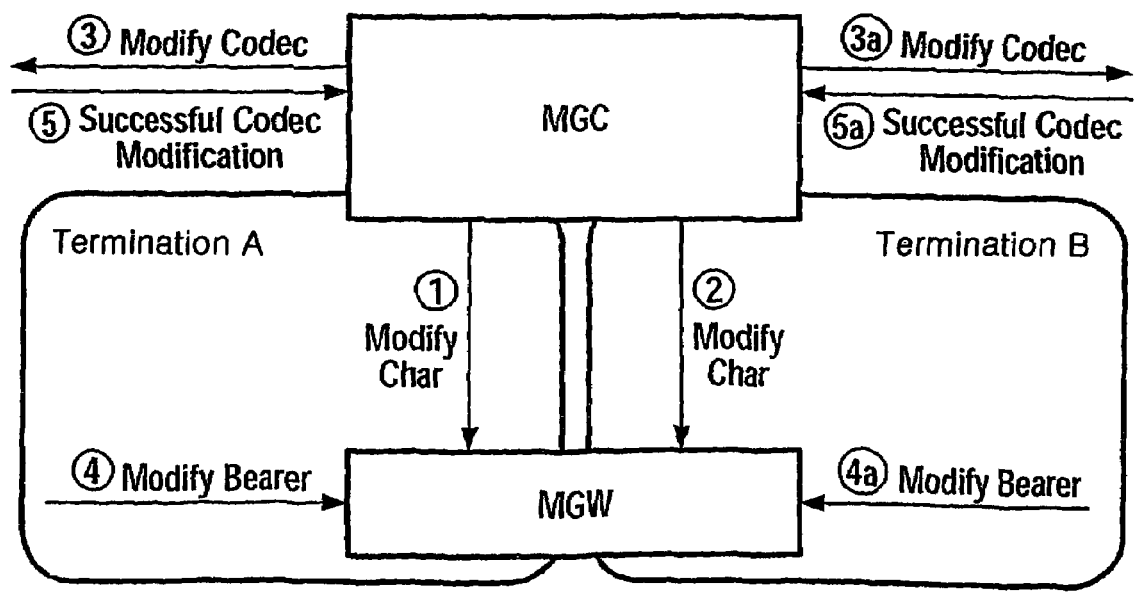
FIG. 4 shows the BICC and CBC message flow when switching over a load connection from one coding to another coding where anMGC and MGW initiate the modification of a coding of a load connection in the direction of two load connection sections connected by the MGW.

FIG. 4 shows an aspect of the invention in which the BICC and CBC message flow when switching over a load connection from one coding to another coding where a pair having an MGC and an MGW initiates modification of the coding of a load data connection in the direction of two load connection sections connected by the MGW is shown.

The corresponding numbers specify the timing sequence of the messages. Messages 3, 4, 5 and messages 3a, 4a, 5a are executed independently of any other message flow. Messages in the areas delimited by rounded edges each relate to a corresponding termination. For simplification the message flows are only shown for two terminations involved. Further terminations within the connection are handled in a similar way. The terminations are connected to each other within the MGW and lie in the same "context". Messages 1, 2, 4 and 4a are each confirmed by a message in the opposite direction following them.

The BICC procedure "Codec Modification" is shown. With the BICC procedure "Codec Renegotiation", to which the present invention can also be applied, the message flow is identical, but instead of the "Modify Codec" message 3 and 3a the "Modify to Selected Codec information" message is used.

The message flow is used in accordance with this aspect of the invention as follows:
1. Messages 1 and 2 (Q.1950 "Modify Characteristics") are sent by the MGC and confirmed by the MGW before the MGC sends the messages 3 and 3a (Q.1902.4 "Modify Codec). According to Q.1902.4 the only requirement is for the MGC to send message 1 before message 3 and message 2 before message 3a.
2. Messages 1 and 2 (Q.1950 "Modify Characteristics") are used unchanged, as described in the protocols. The way that the MGW behaves in relation to these messages changes fundamentally.
3. After the arrival of message 1, the MGW checks whether this message is the first instruction relating to the corresponding "context" which requires a change to the coding. If this condition applies, the MGW deactivates the terminations associated with this termination as well as the terminations in the same "context". The message explicitly defines the desired new coding for the "context".
4. Subsequently the MGW activates termination A, i.e. puts this into the transmit and receive load data state.
5. After arrival of message 2, or 4, or 4a, the MGW checks whether in the new coding a connection of the terminations A and B is possible.
6. The MGW activates termination B again using the new coding where message 2 is used in Point 5 following the arrival of message 4a and thereby "connects" terminations A and B.
7. Further inactive terminations not shown here are changed in a similar way.

What is claimed is:

1. A method comprising:
executing a first command from a media gateway controller to a media gateway;
changing the coding at least one of a plurality of load data connection section terminations at the media gateway based on the first command; and
establishing, based on one or more additional signal commands received by the media gateway, if the media gateway has available all current commands to be executed for changing the coding in the terminations;
wherein, if all of the current commands are available, the media gateway checks for the connectability of the terminations having the changed coding.

2. The method according to claim 1, wherein the media gateway delays any activation of a transcoding for which the coding now differs, until the media gateway establishes that it has available all the commands for changing the coding of terminations.

3. The method according to claim 1, wherein, after an arrival of a command for changing the coding of at least one termination, the media gateway determines whether the command that has arrived is a first not yet processed command for changing the coding of a termination, and if it is, isolates or deactivates all terminations until the media gateway establishes that it has received all current commands for changing the coding of a termination.

4. The method according to claim 1, wherein the checking for the connectability of the terminations includes checking the terminations with the changed coding to determine whether the changed coatings are the same, and if they are the same, connecting the terminations without activation of a transcoding.

5. The method according to claim 4, wherein, if the checking of the connectability of the terminations reveals that the changed codings are not the same, and the media gateway can not convert the changed codings into each other by activating a transcoding, the media gateway sends an error message to the media gateway controller.

6. The method according to claim 1, wherein a sequence of signaling for BICC procedure "Codec Modification" and "Codec Renegotiation" according to Q.1902 is utilized to cause the media gateway to perform a check for a necessary transcoding between the terminations and activation of transcoders that can be used at a point at which, the media gateway has already received signaling relating to a modification of all terminations.

7. The method according to claim 1, wherein the media gateway controller uses a Q.1950 "Reserve Characteristics" procedure to cause the media gateway to modify a termination, and the media gateway only checks and activates the transcoder if the media gateway controller activates the modification of this termination by applying a Q.1950 "Confirm Characteristics" procedure to the media gateway.

8. The method according to claim 1, wherein if the media gateway controller uses a Q.1950 "Reserve Characteristics" procedure to cause the media gateway to modify a termination, and the media gateway only checks and activates the transcoder if the media gateway receives a message to modify a load connection from a second media gateway at another end of a load connection section having a termination in the same context.

9. The method according to claim 1, wherein, if the media gateway controller uses a Q.1950 "Reserve Characteristics" procedure to cause the media gateway to modify a termination, the media gateway also checks and activates a transcoder if the media gateway receives a message to modify the load connection from a second media gateway at another end of a load connection section which has a termination in the same context.

10. The method according to claim 1, wherein, if the media gateway controller uses a Q.1950 "Reserve Characteristics" procedure to cause the media gateway to modify a termination, the media gateway also checks and activates a transcoder if the media gateway has also received from the media gateway controller, for terminations in the same context, commands for modification via the Q.1950 "Reserve Characteristics" procedure or a Q.1950 "Modify Bearer" procedure.

11. The method according to claim 1, wherein, if the media gateway controller uses the Q.1950 "Modify Characteristics" procedure to cause the media gateway to modify a termination, the media gateway only checks and activates a transcoder if a second media gateway at another end of a load connection section corresponding to the termination, signals that the load connection is to be modified.

12. The method according to claim 1, wherein if the media gateway controller uses a Q.1950 "Modify Characteristics" procedure to cause the media gateway to modify a termination, the media gateway also checks and activates a transcoder if the media gateway has received commands from the media gateway to modify all terminations in a same context via a Q.1950 "Reserve Characteristics" procedure or the Q.1950 "Modify Characteristics" procedure.

13. The method according to claim 1, wherein if the media gateway controller jointly modifies a plurality of terminations belonging to a load connection, using a Q.1950 "Modify Characteristics" procedure for at least two terminations, the media gateway controller first executes the "Modify Characteristics" procedure for the terminations before sending for a Q.1902.4 the messages "Modify to Selected Codec information" or "Modify Codec" to the media gateway at another end of a corresponding load connection section.

14. The method according to claim 1, wherein, if after signaling via a Q.1950 protocol using a "Reserve Characteristics" procedure or a "Modify Characteristics" procedure, the coding of a specific termination to he changed in the media gateway, all terminations associated with the media gateway in a same context are deactivated and the media gateway does not direct any load data from or to the terminations, where only the first termination changed goes into a transmit and receive state and forwards load data from and to the associated terminations and the media gateway checks whether it can connect the terminations together in their new coding only after arrival of commands to change the inactive terminations.

15. The method according to claim 1, wherein the media gateway does not immediately reestablish the connections after the checking, but first, even if additionally using separate signaling, the changing of the coding at the terminations is instigated with the media gateway at other ends of the load connection sections to be connected again.

16. The method according to claim 1, wherein the media gateway does not immediately set the relevant termination to transmit and receive load after receiving the command of the media gateway controller, but first, even if using subsequent separate signaling, the changing of the coding is instigated with a second media gateway at another end of the load connection.

17. The method according to claim 1, wherein the media gateway restricts a period of time between the arrival of the first command and the arrival of a command which initiates the checking, and, if corresponding commands for all connected load connections have not arrived within this period of time, the media gateway establishes an original connection of the load connections again with original coding.

18. A system including a media gateway communicatively coupled to a media gateway controller, the media gateway configured to:
   execute a first command from the media gateway controller;
   change the coding of at least one of a plurality of load data connection section terminations at the media gateway based on the first command;
   establish, based on one or more additional signaled commands received by the media gateway, if the media gateway has available all current commands to be executed for changing the codings in the terminations; and
   if all of the current commands are available, check for the connectibility of the terminations having the changed coding.

19. A system according to claim 18, further comprising inputs and/or outputs for the terminations wherein one input conveys commands signaled by the media gateway controller to the media gateway to change the coding of at least one termination, and a control for checking the connectibility of the terminations of this context with the changed coding, said control being embodied such that it only makes this check if all commands to be currently executed for changing codings in the terminations of this context are available at the device as a result of one or more further signaled commands arriving at the device.

20. A device comprising:
   a first media gateway having a plurality of load data section connection terminations, wherein subsets of the terminations are associated with at least one context;
   a second media gateway; and
   a media gateway controller to control the media gateways;
   wherein the media gateway controller controls the first media gateway by sending a plurality of control signals to the first media gateway to change a coding of at least one of the plurality of the terminations;
   wherein based on the plurality of control signals, the media gateway determines if all of the plurality of control signals related to the terminations in the associated context have been received; and
   wherein when the media gateway determines that it has received all of the control signals related to the context, the media gateway changes the coding of the at least one termination.

21. The device according to claim 20, wherein the media gateway determines the compatibility of the termination having the changed coding with any other terminations related to the associated context.

* * * * *